July 12, 1949.   W. H. HOPPMANN, II, ET AL   2,475,614
APPARATUS FOR ELECTRICALLY MEASURING STRAIN
APPLIED IN TESTING STRENGTH OF MATERIALS
Filed Sept. 21, 1945   2 Sheets-Sheet 2

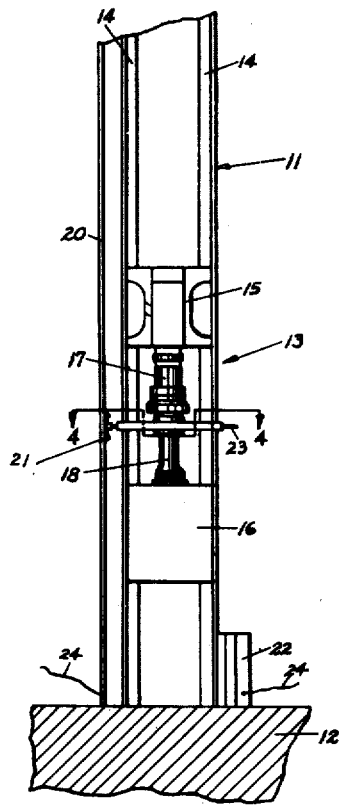
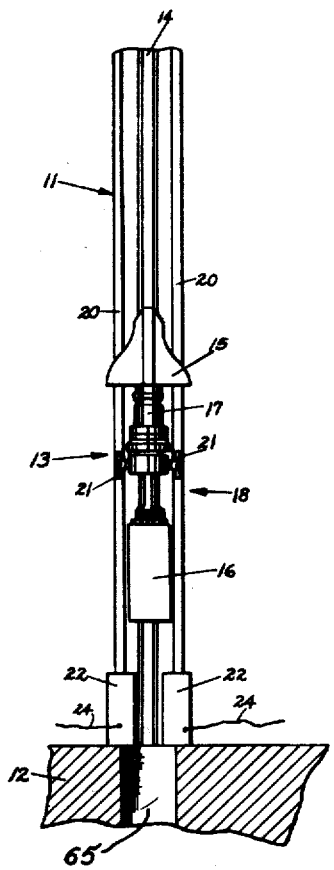
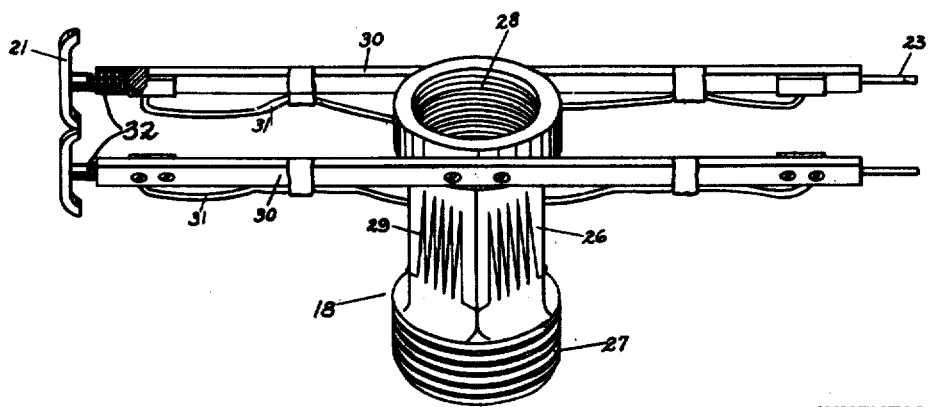

INVENTORS.
William H. Hoppmann II
BY and Edward C. Taylor

Ralph L Chappell
ATTORNEY.

Patented July 12, 1949

2,475,614

UNITED STATES PATENT OFFICE 2,475,614

APPARATUS FOR ELECTRICALLY MEASURING STRAIN APPLIED IN TESTING STRENGTH OF MATERIALS

William H. Hoppmann, II, and Edward C. Taylor, Valley Stream, N. Y.

Application September 21, 1945, Serial No. 617,902

5 Claims. (Cl. 73—12)

(Granted under the act of March 3, 1883, as amended April 30, 1928; 370 O. G. 757)

This invention pertains to the art of testing strength of materials, particularly the art of testing tensile strength of materials under impact stress. The invention is embodied in apparatus for electrically measuring strain applied to materials being tested, the apparatus being particularly adapted to make delicate and precise electrical measurements under the shock of impact testing.

In copending application by William H. Hoppmann, II, Serial No. 617,900, filed of even date herewith, and directed to an Impact tester, of which application Serial No. 64,066, filed December 8, 1948, is a continuation in part, there is disclosed a machine operable to test materials under impact. The apparatus of the present invention, although it is not limited to this use, is particularly adapted to be embodied in the machine of the referred to copending applications, and is operable to determine the magnitude of strain applied in a given test.

It is an object of this invention to provide apparatus for carrying an electric current between a moving body and a stationary body.

It is an additional object to provide apparatus for determining the tensile force acting on a moving body.

It is another object to provide apparatus for making continuous electrical measurements on a moving body and to record the measurements on stationary recording equipment.

It is a further object to provide apparatus for continuously determining the instantaneous tensile force acting on a specimen positioned between a plurality of moving bodies, and transferring these electrical measurements to stationary electrical recording equipment.

Figure 4:
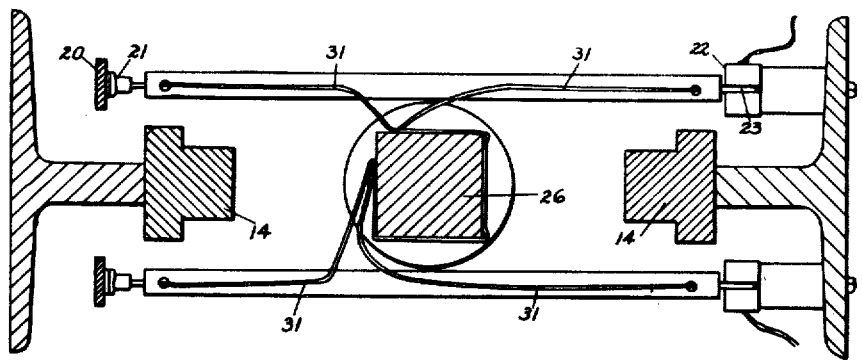
Figure 5:
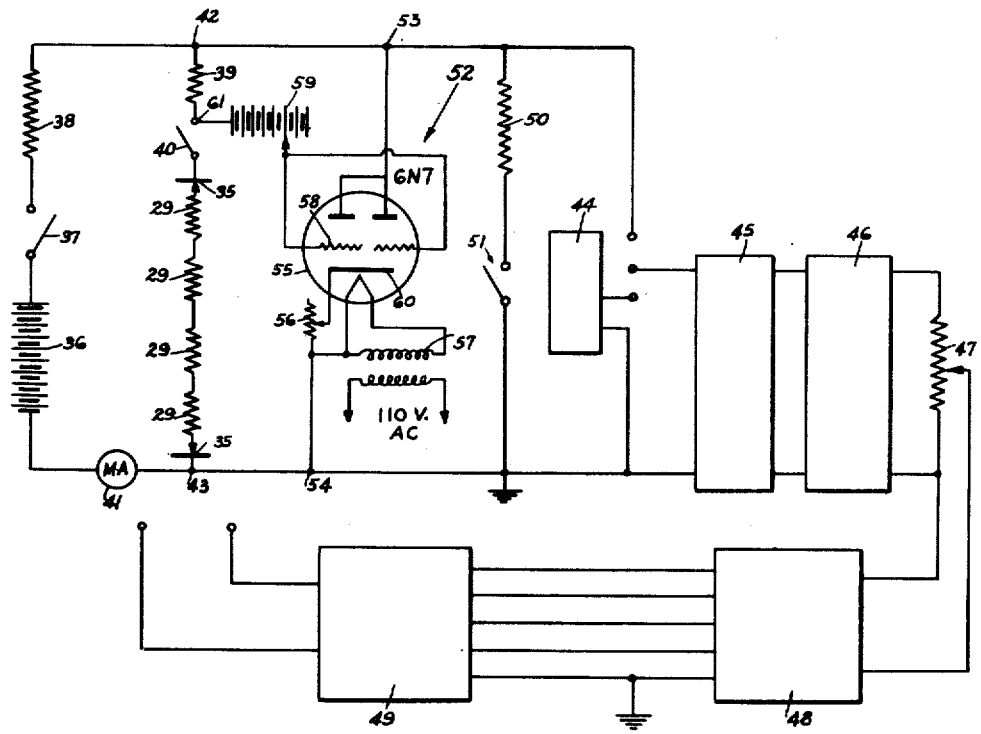

Still further objects and advantages of this invention, as well as its construction, arrangement and operation, will be apparent from the following description and claims in connection with the accompanying drawings, in which Figure 1 is a schematic front elevation of apparatus embodying the invention, Figure 2 is a schematic side elevation of the apparatus shown in Figure 1, Figure 3 is a view in perspective, with certain parts broken away, illustrating a detail of the invention, Figure 4 is a cross-sectional plan, taken along the line 4—4 of Figure 1, and Figure 5 is a wiring diagram, partially schematic, showing an electric circuit suitable for practice of the invention.

The invention is described herein with specific reference to the impact testing equipment disclosed in the hereinbefore mentioned patent application, Serial No. 617,900. However, the invention can be applied to electrical determinations and electrical measurements on all types of moving bodies; if necessary with suitable minor changes and adaptations in the apparatus described herein.

In Figures 1 and 2 there is shown in outline the impact testing equipment hereinbefore referred to, with the electrical measuring apparatus of the present invention forming a part thereof. The testing equipment comprises a tower generally designated 11, which extends upwardly from the anvil 12 to a predetermined height, this construction being the same as the apparatus of copending applications Serial No. 617,900 and Serial No. 64,066 hereinbefore referred to. The specimen assembly 13, is also similar to the disclosure of the copending applications, and comprises the hammer or tup 15 and the weight 16, attached to respective opposite ends of a specimen of the material being tested, the specimen being enclosed inside the spacer 17 and therefore not shown. The specimen assembly 13 is dropped from a predetermined height in the tower 11, and is guided by the rails 14 of the tower 11 toward the anvil 12 with the weight 16 is advance and the hammer 15 trailing. The weight 16 is contoured to enter the aperture 65 of the anvil 12 without interference, and the hammer 15 is contoured to extend laterally and overhang the sides of aperture 65 whereby it strikes the anvil 12. Tensile stress is applied to the specimen of the assembly 13 as a result of the impact, by the masses of weight 16 and hammer 15 moving relatively away from each other.

Under practice of the present invention, attachment of either the hammer 15 or the weight 16 to the specimen is through the "weigh bar" 18, so called, the weigh bar or member 18 being attached between the weight 16 and specimen in the illustrated construction. One end of the specimen is attached to the member 18 by being screwed into the threads 28, Figure 3. The other end of member 18, embodying the screw threads 27, is screwed into the weight 16. As a result of the disclosed construction, member 18 is subjected to the same tension as is applied to the test specimen.

Between the end attachments 27 and 28, the member 18 embodies the bar 26, with a cross-sectional area much greater than the specimen, which is therefore great enough to withstand without permanent deformation whatever impact tension is expected to be applied. Accordingly, the bar 26 will be elongated under the stress of the impact, due to the inherent resiliency of its material, but this elongation is invariably within the elastic limit of the material of bar 26.

One or more copper strips or tracks 20 are suitably mounted in the tower 11, are extended to the top of tower 11 positioned adjacent the path of travel of the specimen assembly 13 on one side thereof and parallel therewith, and are thus adapted to make continuous contact each with a shoe 21 which is supported by the weigh bar 18 in a manner and for a purpose to be described more fully hereinafter.

A set of contacts 22 auxiliary to each track 20, is disposed preferably on the opposite side of the path of travel of the specimen assembly 13. The sets of contacts 22 are mounted at the base of the tower 11 proximate to the anvil 12 in position for electrical connection at the time when the hammer 15 strikes the anvil 12 to make the test. Each set of contacts 22 comprises a pair of opposed strips of conductor material that extend parallel with the path of travel of the specimen assembly 13, and is adapted to make electrical contact with a projecting electric terminal 23 also supported by the weigh bar 18 in a manner and for a purpose to be described more fully hereinafter. Suitable electric leads 24 are connected to copper strips 20 and to auxiliary contacts 22 for electrical connection with measuring and recording equipment, which will be described with Figure 5.

The anvil 12, positioned at the base of the tower 11, has an opening 65 positioned in the path of the falling specimen assembly 13, the opening being of suitable size and shape to permit passage of weight 16 and yet to prevent the passage of tup 15. Thus, when the hammer 15 strikes the anvil 12, it is arrested thereby and the weight 16 continues to fall, whereby the specimen is stretched and ruptured by the weight 16 and hammer 15 moving relatively away from each other, and physically in opposite directions due to rebound of the hammer.

The weigh bar, generally designated 18, is preferably constructed of steel, and comprises a bar 26 with an externally threaded portion 27 at its one end adapted to make a connection with weight 16, and an internally threaded portion 28 at its opposite end adapted to be connected to the specimen. A series of strain gages 29, which comprise each a fine high-resistant wire, are fastened on the sides of bar 26 as shown in the Figure 3 to provide a number of wires lying substantially parallel with the axis of the bar 26 and connected electrically in series. A suitable gage for this purpose is a Baldwin Southwark type C-1 500 ohms resistance-wire strain gage which may be obtained from the Baldwin Southwark Division of the Baldwin Locomotive Works, although it is understood that any similar resistance-wire strain gage may alternatively be used. Four of these strain gages are provided in the disclosed construction, and are fastened to the sides of bar 26 by means of a conventional electrical insulating cement such as, for example, a cellulose acetate cement.

An arm 30 is provided for each track 20, and is attached to the weigh bar 18 adjacent one end thereof to extend outwardly at right angles to the axis thereof. At one end of each arm 30 is a shoe 21, which is electrically connected to the strain gages 29 by means of wire 31 and spring 32. The spring 32 serves the additional purposes of actuating the shoe 21 to bear against track 20 resiliently during the drop of the specimen assembly 13.

At the other end of each arm 30 is a projecting electric terminal 23 that is adapted to make electrical connection with its corresponding auxiliary contact 22 by entering and being pressed between the conductors thereof. A structure satisfactory for the several auxiliary contacts 22 and their coacting terminals 23 is disclosed and described in copending patent application, Serial No. 617,900, entitled Electric contact and filed concurrently herewith by Fred Lager. Each terminal 23 is firmly attached to its arm 30 at the end thereof opposite the shoe 21, and is electrically connected to the strain gage 29 in parallel with the shoe 21 by means of leads 31, Figure 4.

Shoes 21 are placed in contact with their respective tracks 20 at the time a specimen assembly 13 is positioned in the machine for a test, this being accomplished by the tracks 20 extending upwardly from anvil 12 to the top of tower 11. The electrical measuring instruments are thereby conditioned to the electrical characteristics of the test from the start of the test drop and continuously until the test is completed. The tracks 20 accordingly extend downwardly from the top of the tower 11 throughout the distance travelled by the specimen assembly 13.

Springs 32 urge the shoes 21 each into contacting engagement with its track 20 whereby electrical contact is maintained between the moving strain gage 29 and the track 20. Irregularities may develop in a given track 20 anywhere along its length, and these might operate to cause the rapidly moving shoe 21 to jump away from the track and more or less out of contact therewith. The use of a plurality of sets of tracks 20 and shoes 21, connected in electrical parallel, inhibits contact breaks that effect the electrical characteristics of a given test.

Impact of hammer 15 striking the anvil 12 produces a violent shock that is transmitted to the components of the specimen assembly 13, with the resultant likelihood that electrical contact will be broken between all shoes 21 and their tracks 20 during the critical part of a test drop. Auxiliary contacts 22 are provided to obviate this danger.

Contacts 22 extend upwardly from anvil 12 a sufficient distance to be firmly engaged by their respective terminal pins 23 before the hammer 15 strikes the anvil 12. The opposed conductor strips of each contact 22 engage and press firmly against its pin 23, in the manner illustrated in Figure 4, and this condition prevails at the time of impact and continues thereafter until the test is completed. The electrical connection between contacts 22 and their pins 23 is secure enough to withstand the shock of impact. The contacts 22 being in parallel with shoes 21 prevent the shock of impact from breaking electrical contact between the strain gages 29 and the track 20, whereby the electrical characteristics of the test are accurately measured.

The sets of contacts 22 extend downwardly a sufficient distance to maintain contact with their respective pins 23 throughout the continued travel of specimen assembly 13 after impact with the anvil 12. Contact between each pin 23 and its contact 22 continues at least until the specimen becomes ruptured and the weight 16 thereby becomes parted from the hammer 15.

The wiring diagram shown in Figure 5 indicates a means whereby electric impulses generated in the strain gages are transformed into readable and recordable measurements. The strain gages are shown in Figure 5 as four resistances 29 in series. A sliding contact between shoes 21 and the tracks 20, and also contact between pins 23 and contacts 22, is indicated by arrows 35. The circuit in Figure 5 is essentially a potentiometer with the primary circuit passing through battery 36, switch 37, resistance 38, resistance 39, switch 40, strain gages 29 and milliammeter 41. Battery 36 (or alternatively any convenient steady direct current source) is arbitrarily set at a convenient voltage such as, for example, 180 volts. Resistance 38 is a fixed resistance approximately equal to the sum of resistances 29 so that roughly one half the total voltage drop will occur over resistances 29, and resistance 39 is so selected that the voltage across this resistance will be roughly five volts when the primary circuit is completed. An amplifying system is connected to this primary circuit between points 42 and 43, which are so chosen that electrical variations in strain gages 29 and resistance 39 will be amplified and recorded thereby.

The amplifying and recording system comprises essentially an audio-frequency oscillator 44, an impedance coupler 45, a voltage limiting amplifier 46, an attenuator 47, an amplifier and cathode-ray oscillograph 48 and a sweep current generator 49. This amplifier and oscillograph system is conventional; however, this particular amplifying and recording system was selected at least partly because the system as a whole is well adapted to detect and record small electrical variations without being unduly susceptible to large electrical variations. Alternative conventional amplifier systems may be satisfactorily used in this invention but the one outlined in Figure 5 is possibly more advantageous because of this resistance to major electrical fluctuations.

An additional resistance 50, which is extremely large in comparison with resistances 29, e. g., about 500 times as high, is connected in parallel with resistances 29 and the amplifier system hereinbefore described. The purpose of this resistance is to permit calibration in order to determine the change in resistance 29, which is represented by a given displacement in the oscillograph line. Switch 51 permits resistance 50 to be placed in and cut out of the circuit in the calibration operation, and this known variation in the electrical circuit affords a means of determining the sensitivity of the system.

In the use and operation of this apparatus a tensile force acting on the specimen causes a slight variation of the resistance of strain gages 29. This is a common phenomenon and is caused by the stretching of bar 26 within its elastic limit, with its consequent elongation of the wires of gages 29. The variation of the resistance of these gages is relatively small compared to the total resistance of the gage and is practically infinitesimal when compared with the resistance which will be caused if the sliding contacts 35 are not perfectly maintained. Because of this, a faulty contact between track 20 and shoe 21 will result momentarily in an almost infinite resistance which in turn causes an exceptionally powerful signal to be carried to the amplifier system. A finite time is then required for the amplifying system to recover from the comparatively high electrical charge that has been carried to it. Since the impact tester in connection with which this invention is being described contemplates the making of electrical measurements during the very short impact period, a short break in sliding contacts 35 might easily interrupt the oscillograph readings for a sufficiently long period of time to destroy their value. This is particularly true since the impact period is a period of excessive vibrations which tend to increase the possibility of a breaking contact.

Accordingly, there has been provided a by-pass circuit generally designated 52 connected between points 53 and 54 and adapted to carry the current normally accommodated by strain gages 29 during the time when contact 35 is broken. This by-pass circuit is more completely described and disclosed in copending patent application, Serial No. 617,903, entitled By-pass circuit and filed concurrently herewith by Edward C. Taylor and reference herein is made to the disclosure contained therein. However, for a more complete understanding of this invention one embodiment of this by-pass circuit is shown in Figure 5 of the present application and will be described hereinafter in outline.

A suitable vacuum tube 55, for example, six 6—N—7 tubes in parallel, is connected between points 53 and 54 in series with variable resistance 56. The heating current for the filament is provided, as shown, by a conventional A. C. current source operating in conjunction with a step-down transformer 57. The grid 58 is biased on a D. C. power source, for example, battery 59, which in turn is connected to the primary potentiometer circuit between resistance 39 and switch 40. Power source 59 is so selected that the voltage on grid 58 is roughly 6 volts negative with respect to the voltage on cathode 60. In other words, the power source 59 is so selected that the tube in normal operating conditions is operating a few volts below the cut-off voltage.

This by-pass circuit operates essentially as follows. When contact 35 is broken, the current through resistance 39 ceases. When this happens, the potential at point 61 between resistance 39 and switch 40 is raised by the amount represented by the voltage drop across resistance 39, namely roughly 5 volts. This in turn is reflected by an increase in the potential of the grid 58 from its normal value of about minus 6 volts with respect to cathode 60 to about minus 1 volt with respect to cathode 60. This is above the cut-off voltage, and accordingly current flows through tube 55 and resistance 56. Tubes 55 and resistance 56 are so selected and adjusted that the current which flows therethrough is substantially the same as the current normally flowing through gages 29. An accurate adjustment of this value may be obtained by adjusting resistance 56 until opening and closing switch 40 causes no effect on the milliammeter 41.

In the use and operation of this invention a suitable weigh bar 18 is first prepared as shown and described in connection with Figures 3 and 4. The weigh bar 18 is attached to the specimen assembly 13 between the test specimen and the weight 16, and any necessary adjustments of the electrical setup for the test may then be made.

The weigh bar 18 is placed in the electric circuit as diagramed in Figure 5, and resistance 56 is adjusted so that the by-pass circuit 52 is adapted to carry the same current as the strain gages 29. Next the apparatus is calibrated by maintaining switch 51 in a closed position and then opening it suddenly. Opening this switch 51 has the same effect on the recording equipment as increasing resistances 29, for example, by applying a strain to the weigh bar 18.

When the equipment has been thus adjusted and calibrated an impact test is made by dropping the specimen assembly 13 to the anvil 12 from a predetermined height in the tower 11. The oscillograph curve is preferably photographed to provide a permanent record of the force-time conditions in the testing system. The force-time curve thus obtained is a substantially accurate picture of the actual conditions operating on the specimen. There is little or no interference with this curve caused by insecure connection between the weigh bar 18 and the electric track 20, thereby indicating that the effects of the sliding connection have been largely nullified.

It is to be understood that numerous changes and variations may be made in the mechanical and electrical setup of this invention. For example, this electrical measuring system may be applied to numerous uses other than in connection with an impact tester and when so applied certain variations will be obvious to those skilled in the art. Specifically, in numerous instances it will be possible to omit the by-pass described in connection with this invention, particularly where the sliding connections are relatively secure or where the electrical variations to be measured are comparatively large and therefore not liable to be dwarfed by the effect of a poor connection. Similarly, variations in the amplifying and recording systems may be made, and appropriate modifications therein will be obvious to those skilled in the art. Even in connection with the use of this invention in an impact test apparatus certain changes and improvements may be made without departing from the scope of this invention.

Accordingly it is to be understood that the scope and nature of the invention is not to be limited to the apparatus and equipment indicated in the specification but is to be construed in terms of the appended claims.

The invention described herein may be manufactured and used by or for the Government of the United States of America for governmental purposes without the payment of any royalties thereon or therefor.

What is claimed is:

1. In apparatus for testing material under tension, one or more tracks comprising electrical conductors disposed parallel to the direction of the test tension, a bar attached to the test specimen end to end in the direction of test tension, the bar having a large enough cross-section to remain within its elastic limit under strain of the test tension, a strain gage of the electrical resistance type attached to the bar, an arm for each track attached to the bar and extending laterally therefrom towards the track, a shoe of conductor material at the end of each arm in position to engage and ride along the track, and an electrical conductor connecting each shoe with the strain gage.

2. In apparatus for testing material under tension, one or more tracks comprising electrical conductors disposed parallel to the direction of the test tension, a bar attached to the test specimen end to end in the direction of test tension, the bar having a large enough cross-section to remain within its elastic limit under strain of the test tension, a strain gage of the electrical resistance type attached to the bar, an arm for each track attached to the bar and extending laterally therefrom towards the track, a shoe of conductor material at the end of each arm in position to engage the track, an attachment between each shoe and its arm embodying a spring mount operable to press the shoe resiliently against the track while riding along it, and an electrical conductor connecting each shoe with the strain gage.

3. In apparatus for testing material under tension, one or more tracks comprising electrical conductors disposed parallel to the direction of the test tension, a bar attached to the test specimen end to end in the direction of test tension, the bar having a large enough cross-section to remain within its elastic limit under strain of the test tension, a strain gage of the electrical resistance type attached to the bar, an arm for each track attached to the bar and extending laterally therefrom towards the track, a shoe of conductor material at the end of each arm in position to engage and ride along the track, an electrical conductor connecting each shoe with the strain gage, and a potentiometer circuit including a cathode ray oscilloscope in circuit with the rails and operable to record variations of the resistance of the strain gage.

4. In apparatus for testing material under impact tension by impelling a specimen assembly comprising a predetermined mass attached to each of opposite ends of a specimen of the material to strike an anvil, one or more tracks comprising electrical conductors disposed parallel to the path of travel of the specimen assembly, a bar attached to the specimen assembly between one of the masses and the incident end of the specimen, the bar having a large enough cross-section to remain within its elastic limit under strain of the test tension, a strain gage of the electrical resistance type attached to the bar, an arm for each track attached to the bar and extending laterally therefrom towards the track, a shoe of conductor material at the end of each arm in position to engage and ride along the track, and an electrical conductor connecting each shoe with the strain gage.

5. In apparatus for testing material under impact tension by impelling a specimen assembly comprising a predetermined mass attached to each of opposite ends of a specimen of the material to strike an anvil, a bar attached to the specimen assembly between one of the masses and the incident end of the specimen, the bar having a large enough cross-section to remain within its elastic limit under strain of the test tension, a strain gage of the electrical resistance type attached to the bar, one or more tracks comprising electrical conductors disposed on one side of the path of travel of the specimen assembly and disposed parallel thereto for the extent of its travel, a set of contacts for each track on the opposite side of the path of travel, each set of contacts comprising opposed lengths of conductors disposed parallel to the path of travel of the specimen assembly for the extent of its travel from the time of impact until the test is complete, an arm for each track attached to the bar and extending laterally therefrom towards the track in one direction and in the other direction towards the set of contacts, a shoe of conductor material at the end of each arm in position to engage and ride along the track, a terminal pin at the other end of each arm positioned to travel between the opposed lengths of conductors in contact therewith, and electrical conductors connecting the shoes and terminal pins with the strain gage.

WILLIAM H. HOPPMANN, II.
EDWARD C. TAYLOR.

REFERENCES CITED

The following references are of record in the file of this patent:

UNITED STATES PATENTS

| Number | Name | Date |
|---|---|---|
| 1,877,467 | Lake | Sept. 13, 1932 |
| 1,985,478 | Yuasa | Dec. 25, 1934 |
| 2,178,422 | Heagney | Oct. 31, 1939 |
| 2,188,303 | Roberts | Jan. 30, 1940 |
| 2,362,589 | Simmons, Jr. | Nov. 14, 1944 |